United States Patent
Temelci-Andon et al.

(10) Patent No.: US 9,088,188 B2
(45) Date of Patent: Jul. 21, 2015

(54) WASTE-HEAT RECOVERY SYSTEM

(75) Inventors: Anayet Temelci-Andon, Lollar (DE); Konrad Herrmann, Linden (DE); Stefan Müller, Marburg (DE); Harald Köhler, Fernwald (DE)

(73) Assignee: ROBERT BOSCH GMBH, Stuttgart (DE)

( * ) Notice: Subject to any disclaimer, the term of this patent is extended or adjusted under 35 U.S.C. 154(b) by 158 days.

(21) Appl. No.: 13/997,606

(22) PCT Filed: Dec. 21, 2011

(86) PCT No.: PCT/EP2011/073620
§ 371 (c)(1),
(2), (4) Date: Sep. 20, 2013

(87) PCT Pub. No.: WO2012/085104
PCT Pub. Date: Jun. 28, 2012

(65) Prior Publication Data
US 2014/0001762 A1    Jan. 2, 2014

(30) Foreign Application Priority Data
Dec. 24, 2010  (DE) .................. 10 2010 056 297

(51) Int. Cl.
*F01K 13/02*  (2006.01)
*F01K 25/08*  (2006.01)
*H02K 7/18*  (2006.01)
*F01K 23/06*  (2006.01)
*F01K 25/10*  (2006.01)

(52) U.S. Cl.
CPC .............. *H02K 7/1823* (2013.01); *F01K 13/02* (2013.01); *F01K 23/06* (2013.01); *F01K 23/065* (2013.01); *F01K 25/10* (2013.01)

(58) Field of Classification Search
CPC ..... H02K 7/1823; F01K 13/02; F01K 23/065; F01K 25/10; F01K 23/06; F01K 23/067
USPC .................... 60/646, 657, 651, 671
See application file for complete search history.

(56) References Cited

U.S. PATENT DOCUMENTS 4,191,021 A * 3/1980 Nakamura et al. .............. 60/657
4,334,409 A   6/1982 Daugas
(Continued)

FOREIGN PATENT DOCUMENTS

CN   101761461    6/2010
CN   201627689    11/2010
(Continued)

*Primary Examiner* — Hoang Nguyen
(74) *Attorney, Agent, or Firm* — Kenyon & Kenyon LLP

(57) ABSTRACT

A waste-heat recovery system for a waste-heat source, made up of an ORC (Organic-Rankine Cycle) postconnected thereto. The waste-heat source is connected with the heating device of the ORC as well as an expansion machine, coupled to a generator, for steam expansion in the ORC, which has magnetic bearings with an associated control device and a power supply via a direct current intermediate circuit of a generator frequency converter. The design and safe operating behavior of a waste-heat recovery system made up of an ORC post-connected to a waste-heat source are optimized. In a power supply failure, the electric energy that a down-running generator continues to generate is used to supply the magnetic bearings with the associated control device in order to ensure a safe operation in the event of a power supply failure.

7 Claims, 1 Drawing Sheet

(56) References Cited

U.S. PATENT DOCUMENTS

| | | | |
|---|---|---|---|
| 4,901,531 A | 2/1990 | Kubo et al. | |
| 7,948,105 B2 * | 5/2011 | Agrawal et al. | 290/52 |
| 8,739,538 B2 * | 6/2014 | Myers et al. | 60/670 |
| 8,839,622 B2 * | 9/2014 | Myers et al. | 60/670 |
| 2006/0010872 A1 | 1/2006 | Singh et al. | |
| 2007/0240420 A1 | 10/2007 | Bronicki | |
| 2008/0252077 A1 | 10/2008 | Myers | |
| 2009/0000299 A1 | 1/2009 | Ast et al. | |
| 2009/0277400 A1 | 11/2009 | Conry | |

FOREIGN PATENT DOCUMENTS

| | | |
|---|---|---|
| DE | 195 41 521 | 7/1997 |
| DE | 10 2005 048 795 | 12/2006 |
| WO | WO 2009/017473 | 2/2009 |
| WO | WO 2009/134271 | 11/2009 |

\* cited by examiner

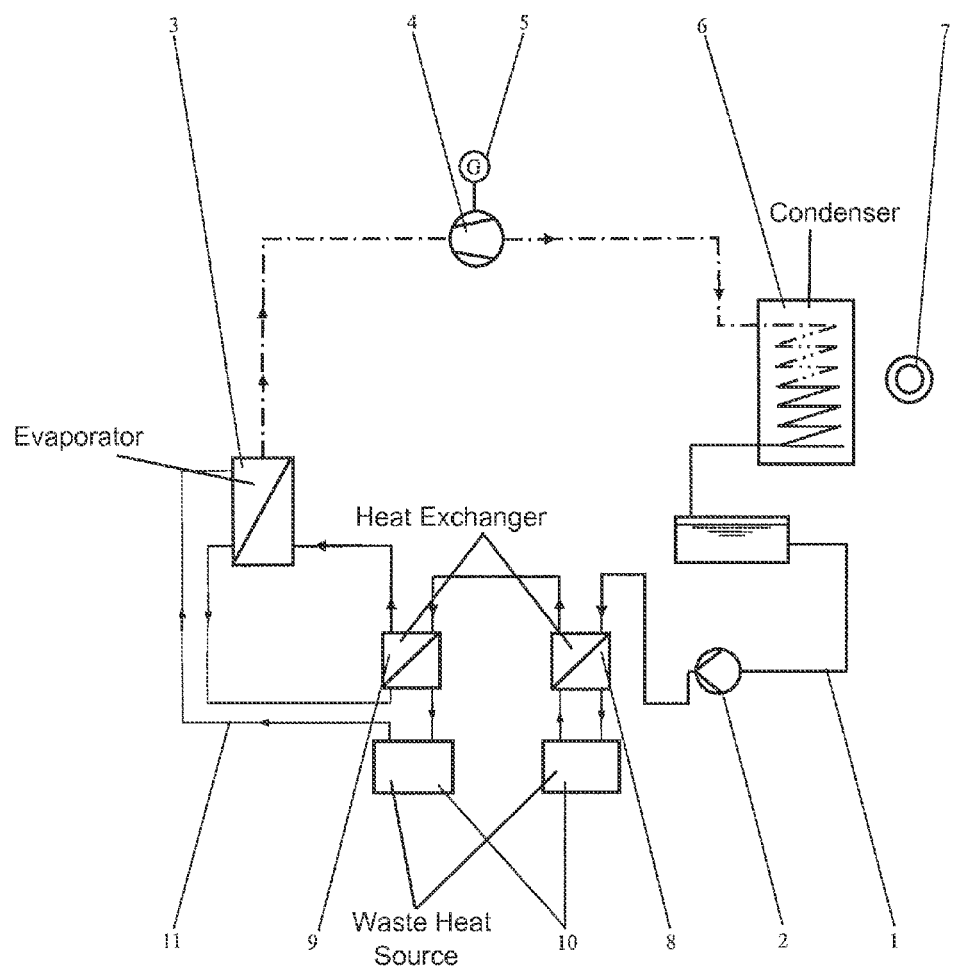

WASTE-HEAT RECOVERY SYSTEM

FIELD OF THE INVENTION

The present invention relates to a waste-heat recovery system.

BACKGROUND INFORMATION

An ORC (Organic-Rankine Cycle) is a thermodynamic cyclical process according to Rankine. This means that a working medium runs through various thermodynamic states in order to be transferred back into the initial liquid state again at the end. In the process, the working medium is brought to a higher pressure level with the aid of a pump. Then, the working medium is preheated to evaporation temperature and subsequently evaporated.

Thus, it is an evaporation process, in which an organic medium instead of water is evaporated. The created steam drives an expansion machine, e.g., a turbine, a piston or propeller motor, which in turn is coupled to an electric generator in order to generate power. Downstream from the working machine, the process medium enters a condenser where it is cooled down again through heat dissipation. Since water evaporates at 100° C. under atmospheric conditions, it is frequently impossible to use heat having a low temperature level, e.g., industrial waste heat or earth heat, to generate power. However, if organic media having lower boiling point temperatures are used, then it is possible to generate low-temperature steam.

ORC systems are advantageous in use also when exploiting biomass in connection with the combined generation of power and heat, for example, especially at relatively low power outputs, i.e., when the conventional biomass combustion technology seems relatively expensive. Biomass plants often have a fermenting device for the production of biogas, which normally has to be heated.

Generic waste-heat recovery systems are known from the cogeneration of electricity and heat field and composed of a combined heat and power plant linked to a downstream ORC. From German Published Patent Application No. 195 41 521, a system is known for increasing the electrical efficiency in the power generation from special gases by combustion engines, in which the waste heat of the motor is utilized for the further energy generation in a post-connected energy-conversion system. However, only the high-temperature heat from the cooling-water circuit and also from the exhaust-gas heat exchanger of the engine is provided for exploitation.

In addition, a diesel power unit integrated into a Rankine process is known from the U.S. Pat. No. 4,901,531, in which one cylinder is used for the expansion according to Rankine, and the other cylinders operate as diesel engine. U.S. Pat. No. 4,334,409 describes a system operating according to the Rankine process, in which the working fluid is preheated by a heat exchanger, through which the air from the outlet of a compressor of a machine having internal combustion is routed.

Block thermal power plants (BHKW) as plants for the cogeneration of electricity and heat are generally known. These are decentralized power generation plants, often driven by combustion engines, featuring a simultaneous utilization of the waste heat. As far as possible, the heat withdrawn via the cooling media is used for heating suitable objects.

In particular in the case of plants for the cogeneration of electricity and heat having a post-connected ORC as waste heat power system, machines have come to dominate that are based on engines having an exhaust-gas turbocharger for charging. That satisfies the demand for machines having very high electrical efficiencies, which are achievable only with the aid of turbocharging and recooling of the combustion-gas mixture heated by the condensation. Cooling of the combustion-gas mixture is generally required because the charge of the cylinder would otherwise be relatively poor. The cooling increases the density of the aspirated mixture, and the volumetric efficiency is improved. The output yield and the mechanical efficiency of the engine increase as a result.

Engine manufacturers stipulate a cooling-water intake temperature of only approximately 40 to 50° C. for the mixture cooling so that sufficient cooling of the mixture to be cooled is possible. Since this temperature level is relatively low, the heat extracted from the combustion-gas mixture in the currently known systems for the cogeneration of electricity and heat systems is dissipated to the environment, e.g., using a table-type cooler.

A system for utilizing waste heat to generate power is known from United States Published Patent Application No. 2007 02 40 420. There, using an ORC, the waste heat is utilized in order to heat a fluid and consequently evaporate it. This evaporated working medium then is employed to drive a shaft and to thereby produce mechanical power, or to produce electric power via an electric generator.

United States Published Patent Application No. 2009 02 77 400 also describes an apparatus for obtaining energy from waste heat. Here, a generator is used, which drives a common shaft via a turbine or an electric generator. Electrical energy in the form of a direct current is generated by the torque shaft. This direct current then is able to be fed into the power supply network and used for other purposes.

In addition, the preheating of the working medium in the ORC in two steps in a heating device is known from German Patent No. 10 2005 048 795, i.e., that the process medium in the ORC is heated by two heat exchangers connected in series downstream from a feeding pump; the first heat exchanger downstream from the feeding pump is provided as a first stage for the incoupling of low-temperature heat, and the following heat exchanger is provided as a second stage for the incoupling of high-temperature heat. The mixture cooling of the combustion engine is connected, via a circulation system, to the first heat exchanger downstream from the feeding pump, the heat from the cooling of the combustion-gas mixture aspirated by the combustion engine being used to preheat the process medium in the ORC and coupled into the first heat exchanger as low-temperature heat. A second heating circuit obtains heat from engine cooling water and from exhaust gas of the combustion engine and is connected to the second heat exchanger downstream from the feeding pump; the heat from the cooling circuit and the exhaust-gas are used to overheat and evaporate the process medium in the ORC and coupled into the second heat exchanger downstream from the feeding pump as high-temperature heat.

SUMMARY

Therefore, an object of the present invention involves optimizing the design and operating behavior of a waste-heat recovery system made up of an ORC post-connected to a waste-heat source.

The waste-heat recovery system is characterized by the fact that in the event of a power outage, the electric energy that the running-down generator continues to generate is used to supply the magnetic bearings with the associated control device. This achieves a safe operation of the expansion machine, because in a mains failure, the bearing control continues to function in that sufficient electric energy is generated from the centrifugal moment of the expansion machine. Only when the power unit is at standstill will the magnetic bearings, more precisely, the shaft of the expansion machine, settle in the associated support.

According to the present invention, in a power outage, the electric energy the down-running generator continues to generate that cannot be fed into the power supply system and is not required to supply the magnetic bearings with associated control device is stored in the direct current intermediate circuit of the associated generator frequency converter. The electric energy continues to drop for as long as the generator is rotating.

This advantageously takes place by briefly raising the voltage in the direct current intermediate circuit in the event of a power supply failure. In the process, the electric energy the running-down generator continues to generate is output to the direct current intermediate circuit via the frequency converter coupled to the generator, to be fed into the power supply network.

In another preferred specific embodiment of the present invention, the excess electric energy the running-down generator continues to generate and which is neither fed into the power supply network nor required to supply the magnetic bearings with associated control device, and which is also unable to be stored in the direct current intermediate circuit, is reduced via at least one electric brake resistor. Excess electric energy is converted into heat in the process.

According to the present invention, a voltage-monitoring device preferably is provided at the frequency converter for infeeding into the power supply network for the voltage in the direct current intermediate circuit. The voltage-monitoring device compares the current voltage in the direct current intermediate circuit to a specifiable maximum value and connects at least one electrical brake resistor if this value has been reached or exceeded.

Using the present invention, the design and the operating behavior of a waste-heat recovery plant composed of an ORC downstream from a waste-heat source, is optimized. Waste-heat sources may be, for example, combined heat and power plants, industrial plants or boiler plants. The measures according to the present invention protect the expansion machine from power outages or keep it in a safe operating state under such an operating condition.

BRIEF DESCRIPTION OF THE DRAWING

The FIGURE represents an exemplary embodiment of the present invention and shows a schematic structure of a waste-heat recovery plant made up of an ORC post-connected thereto.

DETAILED DESCRIPTION

The components that operate the ORC are an ORC circulation circuit 1, a feeding pump 2, an evaporator 3, an expansion machine 4 for vapor expansion, which is coupled to a generator 5, a condenser 6 for recooling via a heat sink 7, and heat exchangers 8, 9 for preheating the working medium in ORC circulation system 1.

The two heat exchangers 8, 9 are connected in series downstream from feeding pump 2. First heat exchanger 8 downstream from feeding pump 2 is used as the first stage for incoupling of the low-temperature heat, and following heat exchanger 9 is used as a second stage for incoupling of the high-temperature heat from a waste-heat source 10.

A second heating circuit 11, via its supply region, is connected to evaporator 3 of the ORC, because the temperature level is initially sufficiently high for its direct heating. After that, second heating circuit 11 discharges into second heat exchanger 9 on the return side, where it releases still existing residual heat to the ORC.

In a power system outage, the electric energy that down-running generator 5 continues to generate is used to supply the magnetic bearings of expansion machine 4 with associated control device (not shown) in order to ensure a safe operation in the event of a power system malfunction.

What is claimed is:

1. A waste-heat recovery system for a waste-heat source, comprising:
    an ORC (Organic-Rankine Cycle) postconnected with respect to the waste-heat source, the ORC including:
    a heating device connected to the waste-heat source,
    a down-running generator, and
    an expansion machine coupled to the down-running generator and for performing a steam expansion, the expansion machine including magnetic bearings, with an associated control device and a power supply via a direct current intermediate circuit of a generator frequency converter, wherein in the event of a power supply failure, an electric energy that the down-running generator continues to generate is used to supply the magnetic bearings with the associated control device.

2. The waste heat recovery system as recited in claim 1, wherein, in the power supply failure, the electric energy that the down-running generator continues to generate and which cannot be fed into a power supply system and is not required to supply the magnetic bearings with the associated control device is stored in the direct current intermediate circuit.

3. The waste heat recovery system as recited in claim 1, wherein, in the power supply failure, the electric energy that the down-running generator continues to generate that cannot be fed into a power supply system and is not required to supply the magnetic bearings with the associated control device is stored in the direct current intermediate circuit in that a voltage in the direct current intermediate circuit is raised briefly.

4. The waste heat recovery system as recited in claim 1, wherein in the power supply failure, the electric energy that the down-running generator continues to generate is output into the direct current intermediate circuit via a frequency converter coupled to the down-running generator, to be fed into a power supply network.

5. The waste heat recovery system as recited in claim 1, wherein an excess electric energy that the down-running generator continues to generate that is neither fed into a power supply network nor required to supply the magnetic bearings with the associated control device, and that is also unable to be stored in the direct current intermediate circuit, is reduced via at least one electric brake resistor.

6. The waste heat recovery system as recited in claim 1, further comprising a voltage-monitoring device at a frequency converter for feeding into a network for a voltage in the direct current intermediate circuit.

7. The waste heat recovery system as recited in claim 6, wherein the voltage-monitoring device at the frequency converter for a power supply feeding compares a current voltage in the direct current intermediate circuit to a specifiable maximum value, and connects at least one electric brake resistor if the current voltage has been one of reached and exceeded.

\* \* \* \* \*